Sept. 23, 1969     E. H. BOHLMANN     3,467,979
DISPOSABLE TOOTH CLEANING IMPLEMENT AND METHOD OF MAKING SAME
Filed Oct. 23, 1967

INVENTOR.
EDWARD H. BOHLMANN
BY
Lynn H. Latta
— ATTORNEY —

United States Patent Office 3,467,979
Patented Sept. 23, 1969

3,467,979
DISPOSABLE TOOTH CLEANING IMPLEMENT
AND METHOD OF MAKING SAME
Edward H. Bohlmann, 12585 Venice Blvd.,
Los Angeles, Calif. 90066
Filed Oct. 23, 1967, Ser. No. 677,289
Int. Cl. A47k 7/02; A47l 13/46; A46b 5/02
U.S. Cl. 15—244                    5 Claims

ABSTRACT OF THE DISCLOSURE

A tooth-cleaning implement of inexpensive construction intended to be used once and then discarded. It comprises a body fabricated of molded plastic material, which may be reinforced by fabric, and a facing of foamed plastic sponge material bonded to the body and providing a yieldable rubbing surface generally like the bristles of a toothbrush.

---

The general object of the invention is to provide an inexpensive tooth cleaning implement adapted to function generally similar to a toothbrush.

Other objects will become apparent in the following description and appended drawing, in which.

Figure 6:
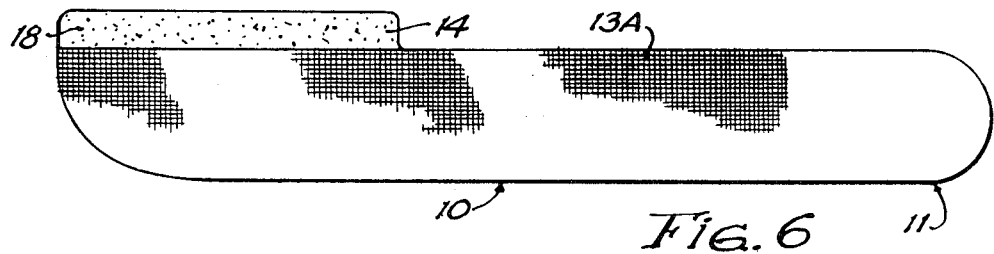
FIG. 6 is a back side view of a modified form of the invention.
Figure 5:
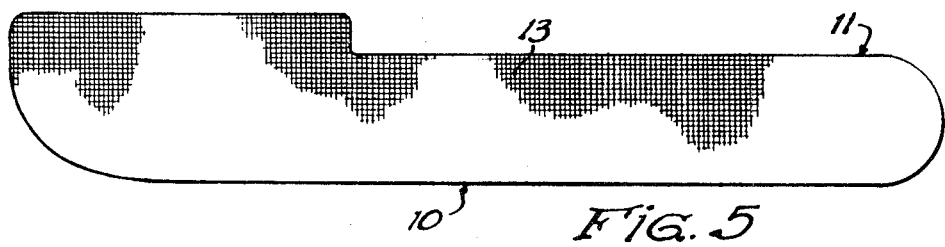
FIG. 5 is a back side view of the same.
Figure 1:
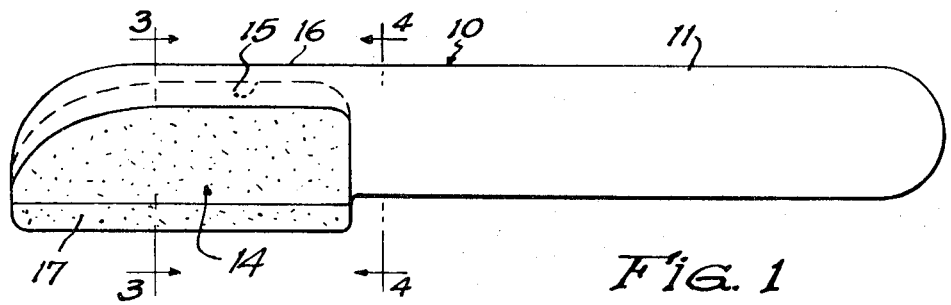
FIG. 1 is a front side view of a cleaning implement embodying the invention, shown of an enlarged scale.
Figure 2:
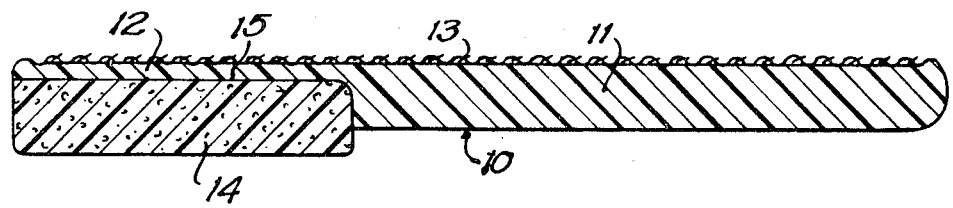
FIG. 2 is a longitudinal sectional view thereof.

Referring now to the drawing in detail, and in particular to FIGS. 1–5, I have shown therein, as an example of one form in which the invention may be embodied, a tooth cleaning implement comprising a body 10 including a handle portion 11 and a backing portion 12; a reinforcing sheet 13 on the back side of body 10; and a cleaning head 14 secured in a cavity 15 in the backing portion 12.

Cleaning head 14 is of foamed cellular plastic sponge material, soft, compressible, resilient and absorbent, so as to conform to the contours of the teeth when pressed against them, and so as to retain a small amount of water when moistened.

Body 10 is of molded plastic material, relatively hard and rigid as contrasted to the soft, yieldable characteristic of the head 14. Backing part 12 is molded around two sides of head 14, with an L-shaped cross-section, including a holding flange 16 on one side, as seen in FIG. 3.

Backing sheet 13 is of glass fiber cloth, or the equivalent, adapted to be impregnated by the resin of body 10 so as to become bonded thereto as the resin is cured.

Figures 3, 4:
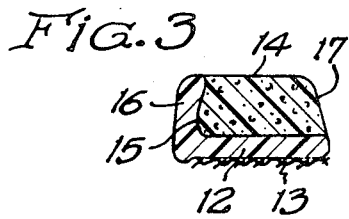
FIG. 3 is a cross-sectional view thereof taken on line 3—3 of FIG. 1.
FIG. 4 is a cross-sectional view taken on line 4—4 of FIG. 1.

Holding flange 16 supports one side of head 14 against tearing loose from backing 12, and can be arcuately overhanging for more secure retention as shown in FIG. 3. At the end of the flange 16 adjoining the handle 10 is an end shoulder to which the inner end of the head 14 is bonded. The opposite side 17 of head 14 is fully exposed so that about half the cross-section of the head projects beyond the rigid margins of cavity 15 for yielding conformation to the tooth contours. The exposed side 17 of the head 14 is, however, inclined at an obtuse dihedral angle to the broad face of the head, so as to decrease the likelihood of the exposed corner tearing loose from the remainder of the head.

In the form shown in FIGS. 1–5, backing sheet 13 covers the full area of body 10.

In the form shown in FIG. 6, the backing sheet 13A covers an area, full length of body 10, corresponding to the width of the handle, the backing web 12 is correspondingly narrowed, and head 14 has a back corner 18 protruding from backing 12.

In the manufacture of the implement, the head is prefabricated by slicing it from a larger body of sponge material, at least the exposed faces thereof being cut so as to expose the cut walls of the sponge cells, such walls becoming the roughened rubbing surfaces of the head which promote the cleansing action. The pre-cut head is embedded in the body 10 when the body 10 is in a liquid or soft plastic state, prior to being cured to its final hard, rigid state. This can be accomplished by placing the head 14 in a recess of a mold cavity properly shaped to receive it and to form the body 10 around the head when liquid resin is poured into the mold above the head. The strip 13 of reinforcing fabric, precut to the proper shape, is then laid on top of the liquid body of plastic resin. The resin is then cured, preferably by means of a chemical curing agent mixed with the resin before it is poured. When the resin is cured, it will be bonded to the head 14 and to the backing sheet 13.

A very inexpensive cleaning implement, which can be used once and then discarded, can be produced in this manner.

In using the cleaning implement, the cleaning head 14 is moistened with water, tooth paste or tooth powder is applied to its moistened surface, and the implement is inserted into the mouth and manipulated to scrub the teeth, much the same as in the use of a conventional toothbrush. Light pressure of the cleansing head against the teeth will cause it to be impressed into the major recesses between the teeth penetrating such recesses and conforming to the surface contours of the teeth. Thus the exposed surfaces of the teeth can be scrubbed and cleansed. After finishing, the user simply discards the implement.

I claim:
1. A disposable tooth-cleaning implement comprising:
a relatively hard, rigid body of molded synthetic resin plastic material including a handle portion of greater width than thickness at one end and a backing portion at the other end thereof, said backing portion being of L-section comprising a relatively wide back web and a relatively narrow flange projecting from one side margin of said web, said flange and web defining a longitudinal recess between said flange and the forward face of said web;
said web and handle having back faces disposed in a common plane and defining a common back surface of said implement, said handle back face extending the width of said handle;
a head comprising a strip of relatively soft, resilient sponge-plastic material seated in said recess, bonded to said web and flange of the backing portion, and projecting beyond the adjoining surface of said handle portion, said head having exposed faces opposite said web and flange and being yieldable so as to conform to the contours of a series of teeth when pressed thereagainst, so as to enter the major recesses between the teeth for scrubbing the same; and
a reinforcing cloth backing sheet bonded to and covering said common back surface of said implement.

2. A tooth-cleaning implement as defined in claim 1, wherein said handle is thicker than said back web and includes an end shoulder abutting and bonded to an end of said head.

3. A tooth-cleaning implement as defined in claim 1, wherein said head is of foamed sponge plastic material with open cells and cut cell walls defining the exposed surface thereof.

4. A tooth-cleaning implement as defined in claim 1, wherein said recess is of acute angular section, said flange overhanging the adjoining side of said head.

5. A method of fabricating a disposable tooth-cleaning implement, comprising the following steps:

fashioning a strip of relatively soft, resilient, sponge plastic material by slicing said strip from a body of said material to provide an exposed surface defined by open cells and cut cell walls;

placing said strip in a recess in a mold cavity shaped to form the body of said implement;

pouring a body of liquid resin over said strip and into said cavity so as to mold a relatively hard, rigid backing body around the back and a side only of said strip and to bond said strip to said backing body with a front portion of the strip exposed and projecting above said backing body so as to function as a cleaning head adapted to conform to surface configuration of a row of teeth when pressed lightly against the same in a scrubbing operation;

and placing a sheet of reinforcing cloth on the upper face of said body of liquid resin in covering relation thereto so as to bond said sheet to said backing body to define the back face thereof upon curing.

References Cited

UNITED STATES PATENTS

| | | | |
|---|---|---|---|
| 92,298 | 7/1869 | Francis | 15—244 XR |
| 1,497,079 | 6/1924 | Gullborg et al. | 15—210 XR |
| 3,087,183 | 4/1963 | Semon | 15—244 |
| 3,109,192 | 11/1963 | Levenson | 15—244 XR |
| 3,228,055 | 1/1966 | Levenson | 15—244 |

FOREIGN PATENTS

| | | |
|---|---|---|
| 123,253 | 10/1919 | Great Britain. |

DANIEL BLUM, Primary Examiner

U.S. Cl. X.R.

15—143; 300—21